United States Patent
Hung-Ju et al.

(10) Patent No.: US 6,402,558 B1
(45) Date of Patent: Jun. 11, 2002

(54) MEMORY CARD ADAPTER

(75) Inventors: Shen Hung-Ju, Ying-Ko Chen; Yu-Chuan Lin, Chu-Pei, both of (TW)

(73) Assignee: Ritek Corporation, Hsinchu (TW)

( * ) Notice: Subject to any disclaimer, the term of this patent is extended or adjusted under 35 U.S.C. 154(b) by 0 days.

(21) Appl. No.: 09/804,957

(22) Filed: Mar. 13, 2001

(51) Int. Cl.⁷ .............................................. H01R 25/00
(52) U.S. Cl. ...................... 439/638; 439/945
(58) Field of Search ................ 439/638, 138, 439/945, 76.1; 361/737

(56) References Cited

U.S. PATENT DOCUMENTS

| | | | |
|---|---|---|---|
| 5,184,282 A | * 2/1993 | Kaneda et al. | 361/395 |
| 5,679,007 A | * 10/1997 | Potdevin et al. | 439/76.1 |
| 5,846,092 A | * 12/1998 | Feldman et al. | 439/76.1 |
| 5,906,516 A | * 5/1999 | Sato et al. | 439/630 |
| 6,010,066 A | * 1/2000 | Itou et al. | 235/379 |
| 6,097,605 A | * 8/2000 | Klatt et al. | 361/737 |
| 6,102,715 A | * 8/2000 | Centofante | 439/140 |
| 6,109,931 A | * 8/2000 | Yotsutani | 439/76.1 |
| 6,203,378 B1 | * 3/2001 | Shobara et al. | 439/638 |

FOREIGN PATENT DOCUMENTS

| | | | |
|---|---|---|---|
| JP | 8-399427 | * 12/1996 | G06K/17/00 |

* cited by examiner

*Primary Examiner*—Tulsidas Patel
(74) *Attorney, Agent, or Firm*—J. C. Patents

(57) ABSTRACT

An integrative memory card adapter capable of accommodating a compact flash card, a multi-media card, a digital card and a smart media card. By positioning contact pins and entrance slots in various locations on the memory card adapter according to the specifications and input/output contact positions of various memory cards, all four types of memory card are accommodated. The memory cards can be accommodated because the input/output contact points of each memory card are in contact with corresponding contact pins inside the slots. The contact pins are in turn wired to a printed circuit board with external connection.

20 Claims, 5 Drawing Sheets

MEMORY CARD ADAPTER

BACKGROUND OF THE INVENTION

1. Field of Invention

The present invention relates to a memory card adapter. More particularly, the present invention relates to an adapter capable of accommodating four types of memory cards including the compact flash card, the multi-media card, the security digital card and the smart media card.

2. Description of Related Art

Following the rapid progress in semiconductor manufacturing industry, memory cards having a variety of capacities and capable of working in different states have been developed. A common trend in the development is to produce a lighter, smaller and compact memory card with a greater memory capacity. Memory cards that can be found in the market include flash memory cards, multi-media cards, secure digital cards and smart media cards. Because the multi-media card belongs to the generation preceding the secure digital card, the memory card adapter for accommodating the digital cards can also accommodate the multi-media card. However, the flash memory card and the multi-media memory card both use different sets of fixed specifications. Each card must thus employ a compatibility adapter to connect with a personal computer, a digital camera or other host machines. In general, a flash memory card has 50 input/output contact points, a multi-media card has 7 input/output contact points, a secure digital card has 8 input/output contact points and a multi-media memory card has 22 input/output contact points. Because each type of memory card has a different number of input/output contact points, multiple adapters must be purchased if the functions provided by a multiple types of memory cards are demanded at the same time. Such variety of adapter cards not only inconveniences a user but also adds to the user's expense. In addition, a conventional memory card adapter is designed according to the specifications of a particular memory card. Because the memory card specifications are fixed, the memory card adapter cannot accommodate memory card in other states.

SUMMARY OF THE INVENTION

Accordingly, one object of the present invention is to provide a memory adapter card capable of accommodating four different types of memory cards including compact flash cards, multi-media cards, digital memory cards and smart media cards, thereby enhancing the applications of the memory adapter card and facilitating a memory card user.

To achieve these and other advantages and in accordance with the purpose of the invention, as embodied and broadly described herein, the invention provides a memory card adapter. The memory card adapter includes a frame, a flash memory card pin header and a printed circuit board (PCB). The flash memory card pin header is mounted on and electrically connected with the printed circuit board. The flash memory card pin header has 50 contact pins that correspond to a flash memory card. The frame comprises of an upper frame and a lower frame. The upper frame and the lower frame have 22 and 8 contact pins, respectively. The contact pins in both the upper and the lower frames are electrically connected to the printed circuit board. In addition, the memory card adapter has a card insertion terminal and an external connection terminal. The card insertion terminal has a card insertion slot having a sectional profile for inserting a multi-media card and a card insertion slot having a sectional profile for inserting a smart media card. The card insertion terminal also has one or two movable doors next to the insertion slot for inserting a smart media card. The space enclosed by the movable doors and the smart media card is used as an insertion slot for accommodating a compact flash card.

This invention also provides an alternative type of memory card adapter. The memory card adapter includes a frame, a flash memory card pin header and a printed circuit board (PCB). The flash memory card pin header is mounted on and electrically connected with the printed circuit board. The flash memory card pin header has 50 contact pins that correspond with a compact flash card. The frame comprises of an upper frame and a lower frame. The upper frame or the lower frame includes a 22-contact-pin set as well as an 8-contact-pin set. The contact pins are arranged to form a front and back row inside the frame and the contact pins are all electrically connected to the printed circuit board. In addition, the memory adapter card has a card insertion terminal and an external connection terminal. The card insertion terminal has a card insertion slot having a sectional profile for inserting a multi-media card and a card insertion slot having a sectional profile for inserting a smart media card. The card insertion terminal also has one or two movable doors next to the insertion slot for inserting a smart media card. The space enclosed by the movable doors and the smart media card is used as an insertion slot for accommodating a compact flash card.

In this invention, altogether four memory cards including a compact flash card, a multi-media card, a digital card and a smart media card can be inserted into the memory adapter card. This is possible because each contact pin in the adapter card corresponds to an input/output contact point of a corresponding type of memory card.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
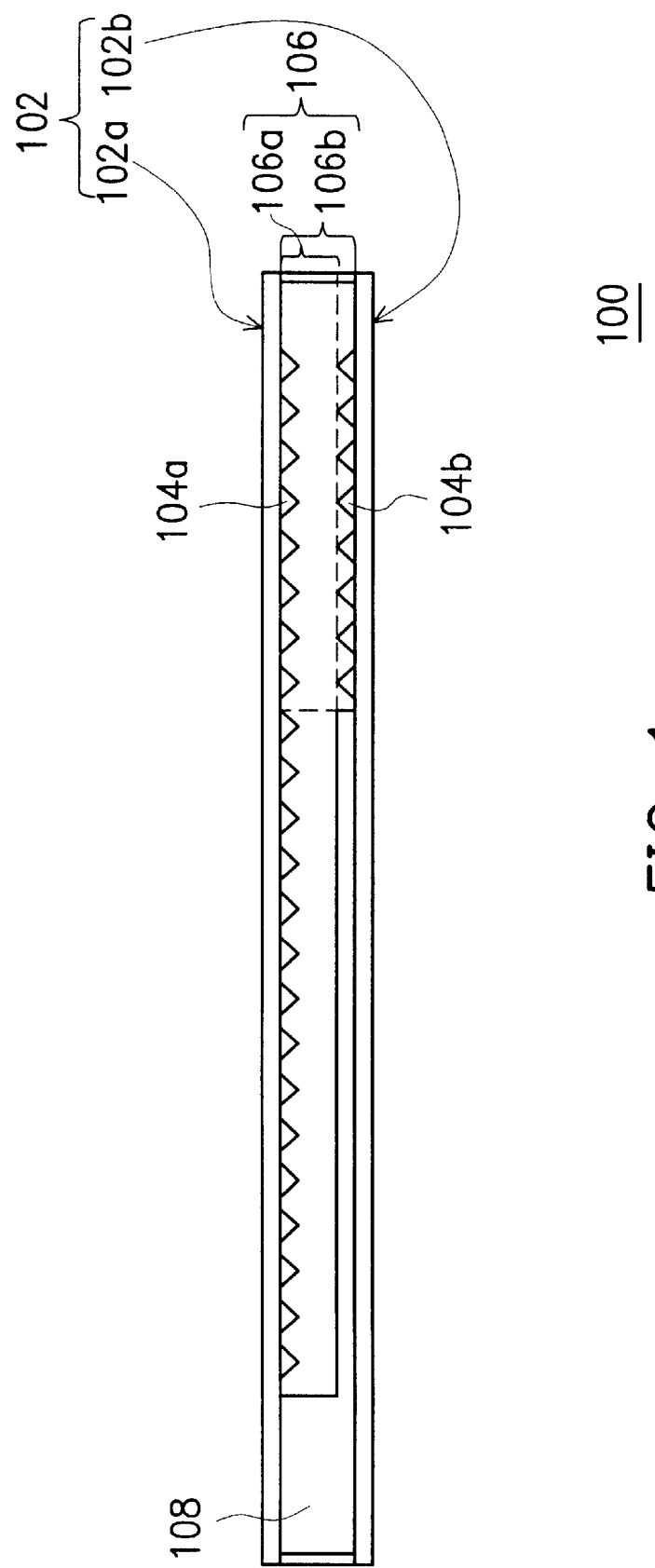
FIG. 1 is a front view of a memory card adapter fabricated according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a front view of a memory adapter card fabricated according to a first preferred embodiment of this invention. As shown in FIG. 1, the memory card adapter 100 has a frame 102. The frame 102 includes an upper frame 102a and a lower frame 102b. The upper frame 102a and the lower frame 102b have a plurality of contact pins 104a and a plurality of contact pins 104b, respectively The number and position of these contact pins corresponds to the input/output contact points of a memory card such as a smart media card, a multi-media card and a digital card. Eight of the contact pins 104b and 22 of the contact pins 104a are constructed using highly conductive copper metal. All of the pins have a bent and protruding structure. Hence, each pin can make a close contact with an input/output contact point on an inserted memory card such as a multi-media card, digital card or smart media card is inserted. In addition, the card insertion terminal of the memory card adapter 100 has an insertion slot 106 with a special multiple structure. The insertion slot 106 includes, for example, a card insertion slot 106a, a card insertion slot 106b and a movable door 108. The card insertion slot 106a has a shape and cross-sectional area identical to a smart media card, for example. Similarly, the card insertion slot 106b has a shape and cross-sectional area identical to a multi-media card or a digital card, for example. In addition, the card insertion slot 106b need not be positioned on one side of the card insertion terminal. The card insertion slot 106b can be designed to fall in the middle of the card insertion terminal so that the frame edges thus emptied out can serve as guide rails for the insertion of the memory card.

The card insertion slot 106b can accommodate a multi-media card or a digital card. Because the eight contact pins 104b are fixed at appropriate positions on the lower frame 102b, the multi-media card or the digital card can be inserted into the card insertion slot 106b with the input/output contact points facing down. Similarly, the card insertion slot 106a can accommodate a smart media card. Because the 22 contact pins 104a are fixed at appropriate positions on the upper frame 102a, the smart media card can be inserted into the card insertion slot 106a with the input/output contact points facing up. The contact pins 104a and 104b connect electrically with a printed circuit board (not shown) in the memory card adapter 100. With this design, an inserted memory card can connect electrically with a personal computer or other host machine via the contact pins 104a, 104b, the printed circuit board (not shown) and an external connection port (not shown).

As shown in FIG. 1, the card insertion terminal of the memory card adapter 100 has a movable door 108. The movable door 108 is located close to the card insertion slot 106a. Moreover, the movable door 108 and the card insertion slot 106a are at similar height level. Therefore, by extending the card insertion slot 106a horizontally, the space can accommodate a compact flash card. In fact, shape and cross-sectional area of the structure formed by the movable door 108 and the card insertion slot 106a are identical to the shape and cross-sectional area of a compact flash card. When a compact flash card is inserted into the card insertion slot 106a, the compact flash card will push open the movable door 108 and finally contact with a pin header at the back.

Figure 2:
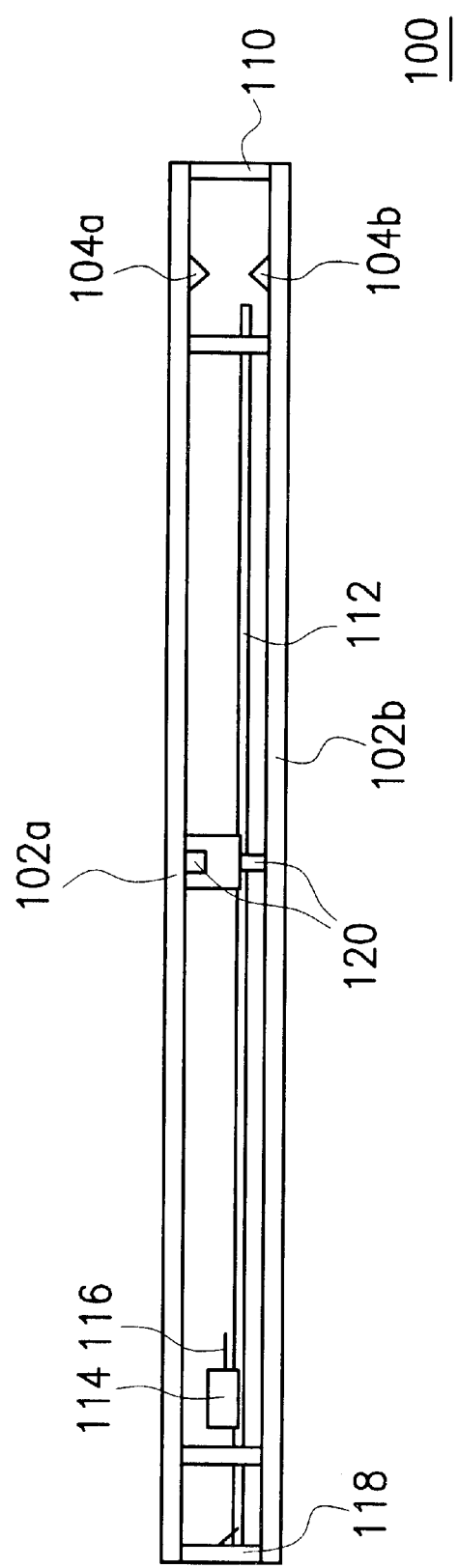
FIG. 2 is a side view of the interior of the memory card adapter fabricated according to the first preferred embodiment of this invention.
Figure 5:
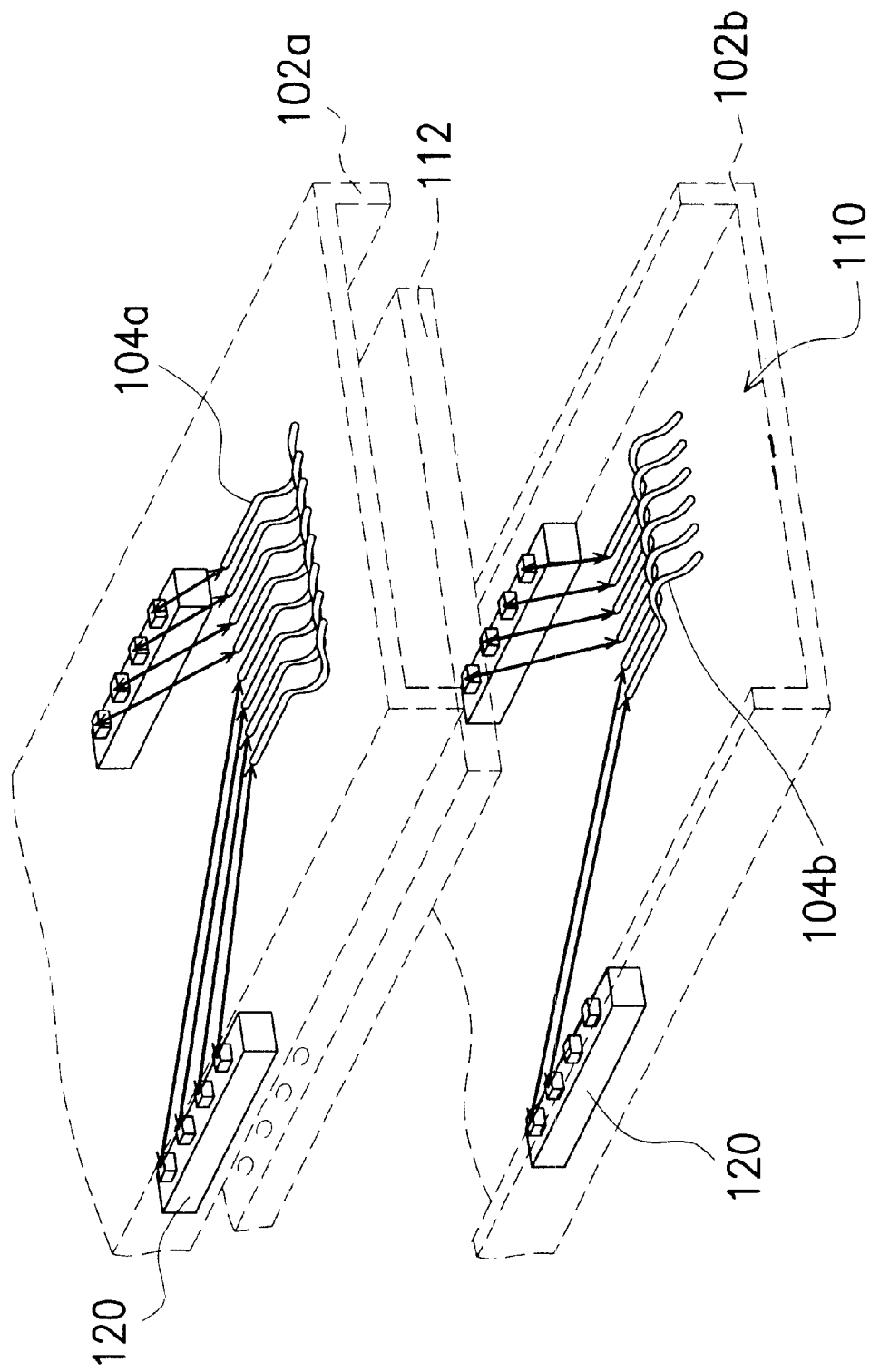
FIG. 5 is a perspective view of a memory card adapter fabricated according to this invention.

FIG. 2 is a side view schematically showing an interior of the memory card adapter, and FIG. 5 is a perspective view of a portion of the memory card adapter fabricated according to the first preferred embodiment of this invention. As shown in FIG. 2 and FIG. 5, each terminal of the memory card adapter 100 has a card insertion terminal 110 and an external connection terminal 118. The contact pins 104a, 104b are fixed at suitable locations in the interior of the upper frame 102a and the lower frame 102b, respectively. Through a connection device 120, the contact pins 104a and 104b connect electrically with the printed circuit board 112. The connecting device 120, for example, can be a line of conductors or other types of electrical connector having a similar function installed in the interior of the memory card adapter 100. A contact header 114 is attached to the printed circuit board 112. The contact pin holder 114, for example, has 50 contact pins 116 that correspond to the input/output contact points of the compact flash card and all the contact pins 116 connect electrically with the printed circuit board 112. The contact pins 104a, 104b, 116 that correspond with the flash card, the multi-media card, the digital card and the smart media card are positioned at various locations in the memory card adapter 100. Hence, the memory card adapter can accommodate all four types of memory cards as long as the printed circuit board 112 is also designed accordingly.

A smart media card (SMC) must be inserted into the memory card adapter with the input/output contact points of the card facing up so that proper electrical contacts with the contact pins 104a can be made. A multi-media card or a digital card must be inserted into the memory card adapter 100 with the input/output contact points of the card facing down so that proper electrical contacts with the contact pins 104b can be made. To make proper electrical contact with the contact pin header 114, however, a compact flash card must be pushed hard enough so that the movable door (not shown) inside the card adapter 100 is opened.

In a second embodiment of this invention, a frame 102 identical to the one in the first embodiment is used. The frame 102 similarly has a card insertion slot 106a, a card insertion slot 106b and a movable door 108. However, positions of the contact pins 104a are changed. Hence, the second embodiment can similarly accommodate all four types of memory cards.

Figure 3:
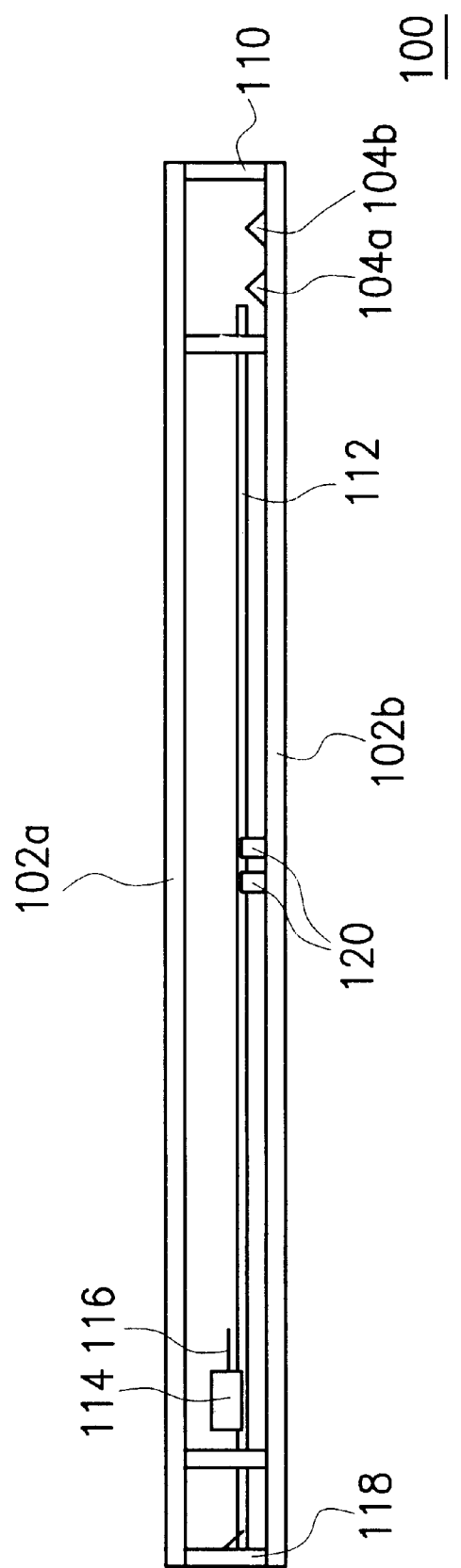
FIG. 3 is a side view of the interior of a memory card adapter fabricated according to a second preferred embodiment of this invention.

FIG. 3 is a side view of a memory adapter card fabricated according to a second preferred embodiment of this invention. As shown in FIG. 3, each terminal of the memory card adapter 100 has a card insertion terminal 110 and an external connection terminal 118. The contact pins 104a and the contact pins 104b are fixed at suitable locations in the interior of the lower frame 102b without any overlap. For example, the contact pins 104b are closer to the card insertion terminal 110 while the contact pins 104a are further away from the card insertion terminal 110. Through a connection device 120, the contact pins 104a and 104b connect electrically with the printed circuit board 112. The connecting device 120, for example, can be a line of conductors or other types of electrical connector having a similar function installed in the interior of the memory card adapter 100. A contact header 114 is attached to the printed circuit board 112. The contact pin holder 114, for example, has 50 contact pins 116 that correspond to the input/output contact points of the compact flash card and all the contact pins 116 connect electrically with the printed circuit board 112. The contact pins 104a, 104b, 116 that correspond with the flash card, the multi-media card, the digital card and the smart media card are positioned at various locations in the memory card adapter 100. Hence, the memory card adapter can accommodate all four types of memory cards as long as the printed circuit board 112 is also designed accordingly.

A smart media card (SMC) must be inserted into the memory card adapter with the input/output contact points of the card facing down so that proper electrical contacts with the contact pins 104a can be made. Similarly, a multi-media card or a digital card must be inserted into the memory card adapter 100 with the input/output contact points of the card facing down so that proper electrical contacts with the contact pins 104b can be made. To make proper electrical contact with the contact pin header 114, a compact flash card must be pushed hard enough so that the movable door (not shown) inside the card adapter 100 is opened.

Figure 4:
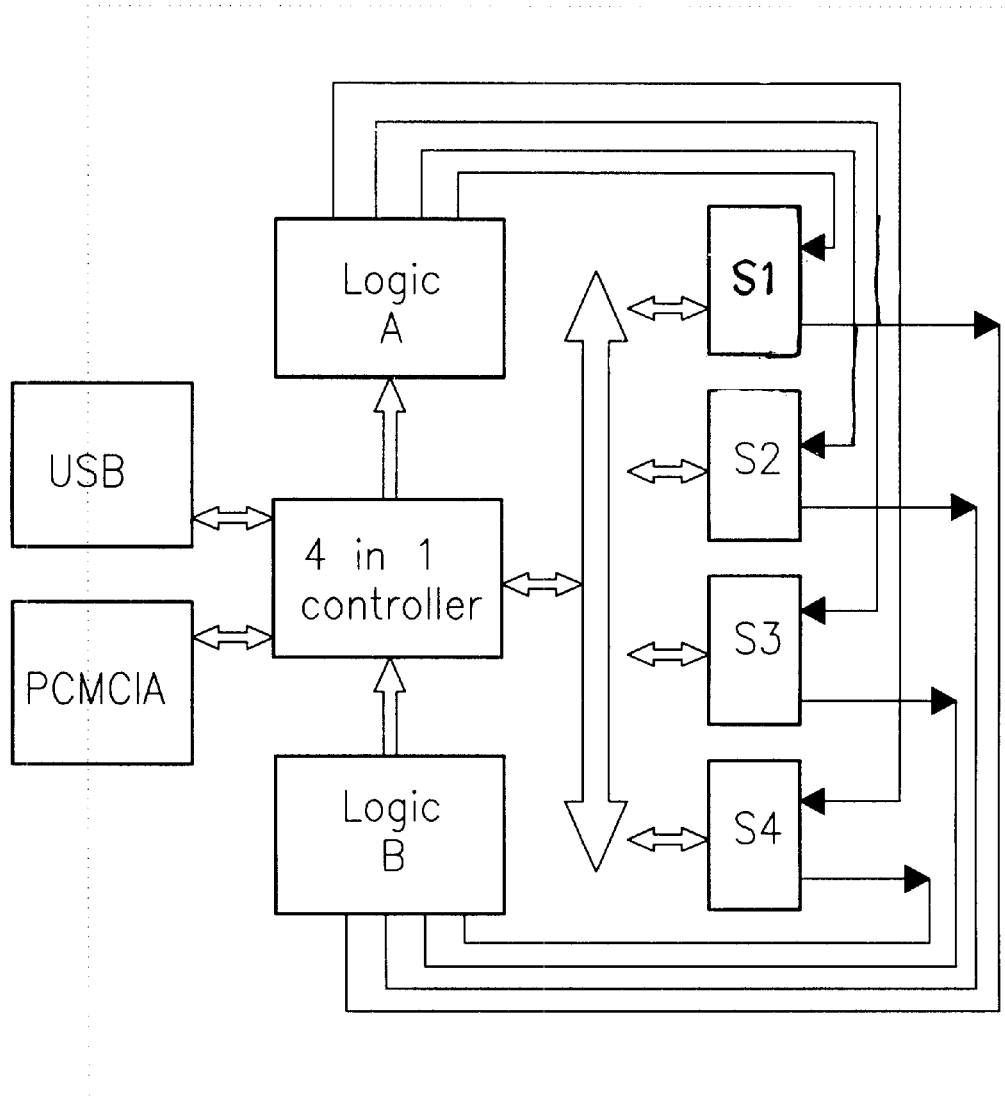
FIG. 4 is an equivalent circuit diagram of the memory card adapter according to the first and the second preferred embodiment of this invention.

FIG. 4 is an equivalent circuit diagram of the memory card adapter according to the first and the second preferred embodiment of this invention. In FIG. 4, S1, S2, S3 and S4 represent the four slots that correspond to the four types of memory cards. Through a logic circuit A and a logic circuit B, the type of memory card inserted into the slots can be ascertained. Finally, the circuit is connected to external circuits such as USB and PCMCIA.

The memory card adapter according to the first and the second preferred embodiments of this invention can accommodate a compact flash card, a multi-media card, a digital card and a smart media card. This, however, does not exhaust all the types of memory cards that can be incorporated into the design.

In summary, major advantages of this invention include the following:

1. The memory card adapter chooses a format compatible with the specifications of a flash card, a multi-mediate card, a digital card and a smart media card. Hence, there is no need to purchase multiple adapters.
2. By integrating all the adapter cards for accommodating a flash card, a multimediate card, a digital card and a smart media card into a memory card adapter, less space is occupied.
3. Since the memory card adapter can accommodate all four types of memory card, a user need not waste time finding or buying a proper card adapter. Hence, both time and cost are saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory card adapter, comprising:
   a printed circuit board;
   a contact pin header on the printed circuit board, wherein the contact pin header connects electrically with the printed circuit board and has a plurality of first contact pins; and
   a frame having a card insertion terminal and an external connection terminal, wherein the frame comprises an upper frame and a lower frame that enclose the printed circuit board and the contact pin header, wherein an interior of the upper frame contains a plurality of second contact pins laid on the upper frame and electrically connected with the printed circuit board, and an interior of the lower frame contains a plurality of third contact pins laid on the lower frame and electrically connected with the printed circuit board, so that a memory card inserted in the memory card adapter through the card insertion terminal connects either the first, second, or third contact pins.

2. The adapter of claim 1, wherein the card insertion terminal further includes:
   a first card insertion slot, wherein the first card insertion slot accommodates a multi-media card or a digital card;
   a second card insertion slot, wherein the second card insertion slot accommodates a smart media card; and
   a movable door, wherein the movable door is located on one side of the second card insertion slot, the movable door and the second card insertion slot together constitute a third card insertion slot, and the third card insertion slot accommodates a compact flash card.

3. The adapter of claim 1, wherein the external connection terminal and the printed circuit board are electrically connected together, and memory cards inserted into slots of the adapter are electrically connected to an external device via the first contact pins, the second contact pins, the third contact pins and the printed circuit board.

4. The adapter of claim 1, wherein the first contact pins are electrically connected to the printed circuit board via the contact pin header.

5. The adapter of claim 1, wherein the first contact pins correspond in position to input/output contact points on the compact flash card.

6. The adapter of claim 1, wherein the second contact pins correspond in position to input/output contact points on the smart media card.

7. The adapter of claim 1, wherein the third contact pins correspond in position to input/output contact points on either the multi-media card or the digital card.

8. The adapter of claim 1, wherein the contact pins of the upper frame and the lower frame are electrically connected together via a connection device.

9. A memory card adapter, comprising:
   a printed circuit board;
   a contact pin header on the printed circuit board, wherein the contact pin header connects electrically with the printed circuit board and has a plurality of first contact pins; and
   a frame having a card insertion terminal and an external connection terminal, wherein the frame encloses the printed circuit board and the contact pin header, and an interior of the frame has a plurality of second contact pins and a plurality of third contact pins, wherein the second contact pins and the third contact pins are respectively laid on spaced-apart locations of the frame and electrically connected with the printed circuit board, so that a memory card inserted in the memory card adapter through the card insertion terminal electrically connects either the first, second, or third contact pins.

10. The adapter of claim 9, wherein the card insertion terminal further includes:
    a first card insertion slot, wherein the first card insertion slot accommodates a multi-media card or a digital card;
    a second card insertion slot, wherein the second card insertion slot accommodates a smart media card; and
    a movable door located on one side of the second card insertion slot, wherein the movable door and the second card insertion slot together constitute a third card insertion slot that accommodates a compact flash card.

11. The adapter of claim 9, wherein the external connection terminal and the printed circuit board are electrically connected together and memory cards inserted into the first and second card insertion slots of the adapter are electrically connected to an external device via the first contact pins, the second contact pins, the third contact pins and the printed circuit board.

12. The adapter of claim 9, wherein the first contact pins are electrically connected to the printed circuit board via the contact pin header.

13. The adapter of claim 9, wherein the first contact pins correspond in position to input/output contact points on the compact flash card.

14. The adapter of claim 9, wherein the second contact pins correspond in position to input/output contact points on the smart media card.

15. The adapter of claim 9, wherein the third contact pins correspond in position to input/output contact points on either the multi-media card or the digital card.

16. A memory card adapter, comprising:

a printed circuit board;

a contact pin header arranged on the printed circuit board, wherein the contact pin header connects electrically with the printed circuit board and has a plurality of first contact pins to connect a first memory card; and a frame structure including an upper frame, a lower frame, and a movable door that enclose the printed circuit board and the contact pin header, wherein the upper and lower frames and the movable door form a card insertion terminal, wherein an interior of the upper frame contains a plurality of second contact pins laid on the upper frame and electrically connected with the printed circuit board, and an interior of the lower frame contains a plurality of third contact pins laid on the lower frame and electrically connected with the printed circuit board, so that various types of memory cards can be inserted in different manners through the card insertion terminal to connect either the first, second, or third contact pins.

17. The adapter of claim 16, wherein a memory card is inserted through the card insertion terminal by pushing on the movable door.

18. The adapter of claim 16, wherein a memory card is inserted through the card insertion terminal by having contact elements of the memory card facing up and electrically contacting the second contact pins.

19. The adapter of claim 16, wherein a memory card is inserted through the card insertion terminal with a plurality of contact elements of the memory card down facing and electrically contacting the third contact pins.

20. The adapter of claim 16, wherein a memory card is inserted through the card insertion terminal by pushing on the movable door, and a plurality of contact elements of the memory card electrically contact the first contact pins.

* * * * *